UNITED STATES PATENT OFFICE.

HUGH RODMAN, OF PITTSBURG, PENNSYLVANIA.

CEMENTATION OR CASE-HARDENING MATERIAL.

949,449.  Specification of Letters Patent.  Patented Feb. 15, 1910.

No Drawing.  Application filed January 10, 1910.  Serial No. 537,274.

*To all whom it may concern:*

Be it known that I, HUGH RODMAN, a citizen of the United States, and a resident of Pittsburg, in the county of Allegheny and State of Pennsylvania, have made a new and useful Invention in Cementation or Case-Hardening Material, of which the following is a specification.

This invention relates to the art of cementation or case-hardening and to material for use therein.

Cementation or case-hardening by dry packing has hitherto, so far as I am aware, involved the use of more or less costly carbonaceous material such as bone dust or powdered charcoal, used alone or mixed with soda-ash or lime. Cementing or case-hardening by dry packing is usually carried out by packing the articles to be treated in the cementing or case-hardening material in closed cast-iron or clay pots, which are externally heated at a temperature varying from 1400° to 2000° Fahrenheit for from a few hours to a few days.

So far as I know the action of the cementing or case-hardening material is not well understood, but carbon from the material is absorbed by the articles treated and it has been thought that the action of the bone dust or powdered charcoal is accelerated or intensified by adding to these materials such substances as lime or sodium carbonate.

I have found that coke, a comparatively pure and cheap form of carbon, which in itself has practically no case-hardening properties, can be rendered active as a cementing or case-hardening material by adding thereto an energizing substance, for example lime, sodium hydrate or soda-ash, and I have found in use that such material does not mar or pit the surface of the metal articles or parts treated. By energizing substance, I mean such material, not necessarily carbonaceous material, as will when added to an inactive carbonaceous substance, render such carbonaceous substance active, as a carbonizing agent. Various mixtures of coke and these energizing substances may be used, but I find that excellent results may be obtained from a mixture of 100 parts by weight of oak granules, about 1/4 inch diameter, 15 parts of finely powdered soda-ash and 10 parts of finely powdered slaked lime. I prefer to mix these materials by first adding to the coke granules sufficient oil (preferably a heavy hydro-carbon oil) to cover the surface of the granules and then to add the powdered soda-ash and lime, stirring it so that the powdered soda-ash and lime will adhere to the coke granules. I find that the material is improved somewhat as a commercial product by the addition of the oil, for a thorough admixture of the constituents of the material is thus maintained.

It is necessary that the cementing material should not pit or mar the surface of the metal parts treated and I have found that in order to preserve a good surface on the metal parts it is essential that in selecting the energizing substances those evolving harmful substances such as fluorin must be avoided.

Having thus described my invention, what I claim is:

Cementing or case hardening material consisting essentially of coke, soda-ash and lime.

In testimony whereof, I have hereunto subscribed my name this 7 day of Jan., 1910.

HUGH RODMAN.

Witnesses:
A. C. MASON,
B. M. FERA.